United States Patent [19]

Carnahan

[11] Patent Number: 5,370,721
[45] Date of Patent: Dec. 6, 1994

[54] CEILING FAN FILTER

[75] Inventor: Joe B. Carnahan, Dallas, Tex.

[73] Assignee: Giftech Filter Products, Inc., Keller, Tex.

[21] Appl. No.: 61,494

[22] Filed: May 13, 1993

[51] Int. Cl.⁵ .......................................... B01D 39/14
[52] U.S. Cl. ............................... 55/279; 55/467;
55/524; 55/527; 96/132; 422/124; 416/62
[58] Field of Search .............. 55/279, 467, 524, 527, 55/528; 96/132, 134, 135, 136, 137; 422/120, 122, 124; 416/62; 95/277; D23/365

[56] References Cited

U.S. PATENT DOCUMENTS

| | | | |
|---|---|---|---|
| D. 258,081 | 1/1981 | Britt et al. | D23/150 |
| D. 258,758 | 3/1981 | Johnson | D23/146 |
| D. 281,272 | 11/1985 | Lynch, Jr. | D23/149 |
| D. 306,198 | 2/1990 | Matherne | D23/365 |
| D. 308,721 | 6/1990 | Ahl | D23/366 |
| 3,347,025 | 10/1967 | Wiley | 55/279 |
| 3,500,618 | 3/1970 | Sokol | 55/527 |
| 4,251,239 | 2/1981 | Clyde et al. | 55/528 |
| 4,274,843 | 6/1981 | Sone et al. | 55/276 |
| 4,340,402 | 7/1982 | Catron | 55/527 |
| 4,411,948 | 10/1983 | Ogino et al. | 55/524 |
| 4,422,824 | 12/1983 | Eisenhardt, Jr. | 55/467 |
| 4,468,372 | 8/1984 | Seifert et al. | 422/124 |
| 4,504,191 | 3/1985 | Brown | 416/95 |
| 4,534,775 | 8/1985 | Frazier | 55/524 |
| 4,540,625 | 9/1985 | Sherwood | 55/524 |
| 4,560,321 | 12/1985 | Kawai | 416/99 |
| 4,631,297 | 12/1986 | Battice et al. | 55/279 |
| 4,668,258 | 5/1987 | Steer | 55/524 |
| 4,676,721 | 6/1987 | Hardee | 416/62 |
| 4,750,863 | 6/1988 | Scoggins | 416/5 |
| 4,753,573 | 6/1988 | McKnight | 55/467 |
| 4,832,572 | 5/1989 | Prucha et al. | 416/62 |
| 4,840,650 | 6/1989 | Matherne | 55/467 |
| 4,889,543 | 12/1989 | Burt | 55/471 |
| 4,904,343 | 2/1990 | Giglia et al. | 55/527 |
| 4,944,898 | 7/1990 | Glaser | 422/124 |
| 4,955,995 | 9/1990 | Pontius | 55/524 |
| 5,019,434 | 5/1991 | Matsumoto | 239/55 |
| 5,022,819 | 6/1991 | Murcin et al. | 416/62 |

Primary Examiner—Robert J. Warden
Assistant Examiner—T. A. Trembley
Attorney, Agent, or Firm—Grady K. Bergen; James E. Bradley

[57] ABSTRACT

A ceiling fan filter for filtering the air in a room having a ceiling fan is made from at least one layer of resilient polymeric fiber filter material. Each layer has a length, a width, an upper surface, a lower surface and two side edges which extend along the length of the layer. A narrow compressed strip is formed in the filter material by compressing and heating the layer of filter material so that the filter material is fused together. The compressed strip causes an expanded thickness of the side edges to increase the effective filter surface area of the filter and gives the filter a semicircular cross-sectional shape perpendicular to the length of the filter. An adhesive layer is joined to the lower surface of the filter to attach the filter to the fan blade of a ceiling fan.

33 Claims, 3 Drawing Sheets

CEILING FAN FILTER

BACKGROUND OF THE INVENTION

1. Field of the invention

This invention relates to an air filter which attaches to a ceiling fan for filtering the air in a room.

2. Description of the Prior Art

There are numerous devices for filtering the air in a room. Some of these devices have combined the use of a ceiling fan with an air filter for filtering the air while the ceiling fan is in operation. These ceiling fan filters usually consist of attaching some type of air filter material to the blade or blades of the fan so that the filter is moved through the air as the ceiling fan is rotated. The filter collects debris and particles from the air as it moves through the air.

Filter material has been attached to portions of the blade by providing a structural support to hold the filter in place and to keep the filter from deforming. Filter material has also been attached to the blade without any structural support, however, this has required the filter material to be rigid or flat so that the filter material would not deform or collapse from the pressure of the air as the air circulates over the fan. Blade covers made of dust-absorbent materials which fit substantially over the entire surface of the blade and are fastened in place have also been used.

SUMMARY OF THE INVENTION

This invention is directed toward a ceiling fan filter and method of forming the same. A ceiling fan filter is made of a flexible, resilient filter material, such as non-woven polyester fiber. The filter material is formed as a layer having a width, an upper surface, a lower surface, two side edges which extend along the length, and two end edges across the width of the filter. A compressed strip is formed in the layer of filter material which deforms the layer, causing two halves of the upper surface to be located in separate planes. This results in an expanded thickness of the side edges so that the filter has a semicircular cross section perpendicular to the length of the layer, thus increasing the effective surface area of the filter.

The compressed strip is formed by applying pressure and heat to the filter material, causing the filter material to fuse together in a compressed form. The heat and pressure is applied by a heat fusion bar which is lowered onto the layer of filter material. Several layers can also be joined together to form a single filter by fusing the layers together using the same method.

DETAILED DESCRIPTION OF THE INVENTION

Figure 1:
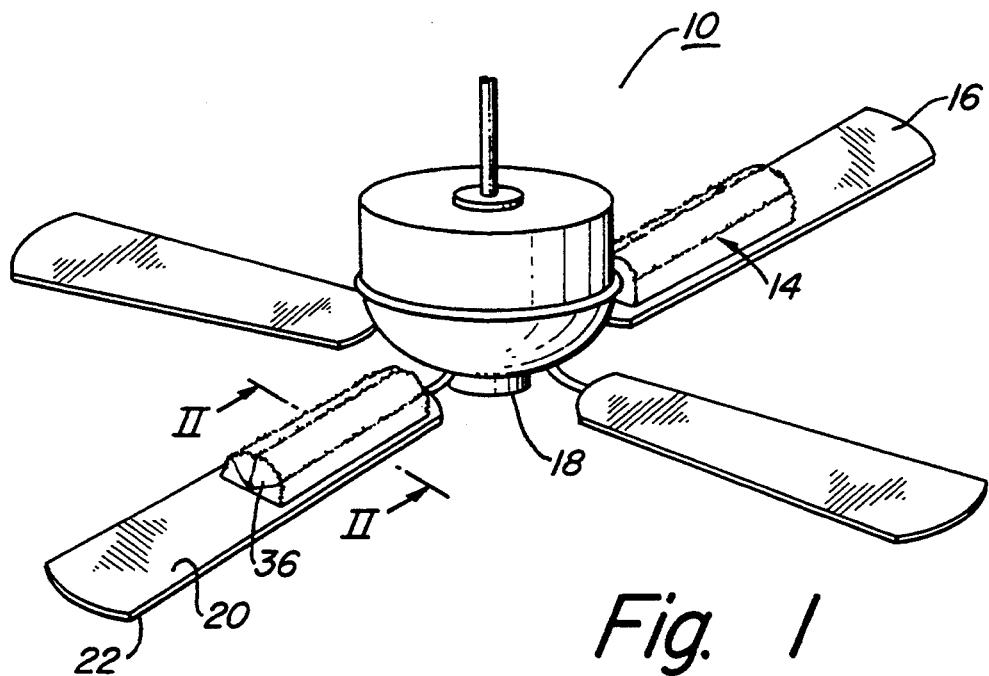
FIG. 1 is a perspective view of a ceiling fan filter attached to the blades of a ceiling fan and constructed in accordance with the invention.

Referring now to the figures, FIG. 1 shows a ceiling fan 10 and the filter 14 of the invention. The ceiling fan 10 has a set of radially extending blades 16 which extend from a central hub 18. Each blade 16 has an upper surface 20 and side edges 22. The filter 14 is attached to the upper surface 20 of one of the blades 16.

The filter 14 consists of at least one layer 24 of flexible, lightweight filter material. A resilient polymeric filter material, such as non-woven polyester fiber, is preferable. The layer 24 has an upper surface 28 and a lower surface 30 which attaches to the blade 16. Side edges 32, 34 extend along the length of the layer 24. End edges 36 on each end of the layer 24 extend across the width of the layer 24. The width of a typical filter 14 is approximately three inches and may have a height or thickness in the range of 0.5 to 3.5 inches. A filter 14 having a height greater than 3.5 inches may affect the operation of the fan 10. The length of the filter 14 should be no longer than sixty percent (60%) of the length of the blade 16 with eight to ten inches being the most desirable lengths.

Figure 2:
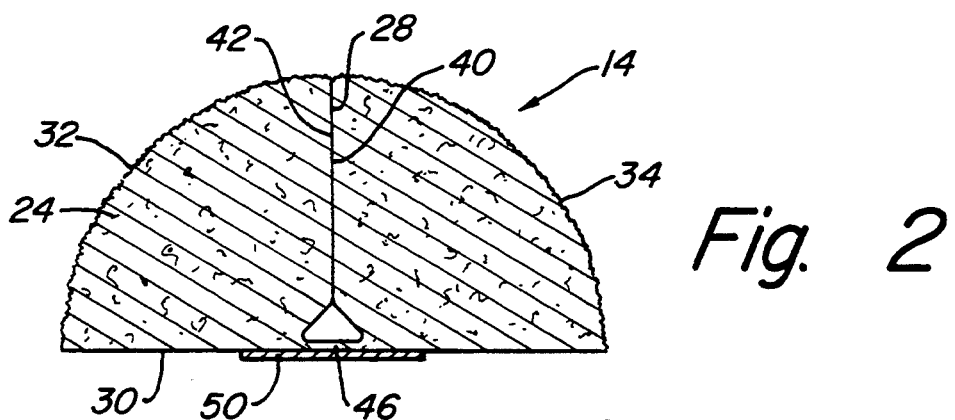
FIG. 2 is a cross-sectional view of the filter of FIG. 1, taken along the line 3 II—II of FIG. 1, and constructed from a single layer of filter material in accordance with the invention.

As shown in FIG. 2, the filter 14 has a substantially semicircular cross-sectional area which is perpendicular to the length. The upper surface 28 is divided into two halves 40, 42 by a narrow compressed strip 46 that is located in the center of the upper surface 28 and extends along the length of the layer 24 to the end edges 36. The compressed strip 46 has a thickness which is substantially less than the initial thickness of the side edges 32, 34 and causes the thickness of the side edges 32, 34 to be increased from the initial thickness prior to the formation of the compressed strip 46 so that the effective filter surface area is increased. Each half 40, 42 of the upper surface 28 is located in a separate plane and is in a contacting relationship with the other so that the filter material of the filter 14 is generally continuous throughout. The halves 40, 42 of the upper surface 28 are generally upright relative to the lower surface 30 when the filter 14 is attached to the blade 16.

Figure 7:
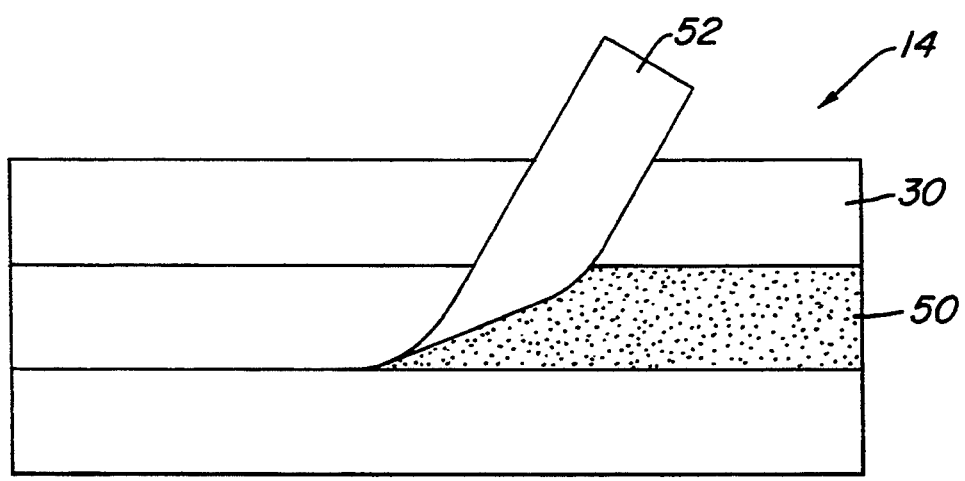
FIG. 7 is a bottom view of the filter of FIG. 2, showing the adhesive strip as constructed in accordance with the invention.

A layer of adhesive 50 is attached to the lower surface 30 of the layer 24 substantially along the compressed strip 46. This enables the filter 14 to be attached to the blade 16. The adhesive 50 may consist of a strip of double-sided tape having protective backing material 52 (FIG. 7). The backing material 52 is removable so that the filter 14 can be attached to the blade 16.

The layer 24 of filter material may also be coated with different coatings to enhance the performance of the filter 14. These coatings may consist of such things as anti-microbial agents, tackifiers, activated carbon or fragrance. The coatings may be applied prior to the formation of the compressed strip 46.

When mounting the filter 14 on the blade 16, the backing 52 (FIG. 7) of the adhesive strip 50 is removed from the outer surface of the strip 50 and the filter 14 is attached to the fan blade 16 so that the filter 14 is located substantially on the longitudinal axis of the blade 16. The filter 14 should be positioned as close to the hubs 18 as possible, but no greater than one inch from the end of the blade 16 nearest the hub 18. When the filter 14 is attached, the compressed strip 46 and side edges 32, 34 will be generally parallel to the edges 22 of the blade 16.

In order to balance the fan 10, more than one filter should be used. This may be accomplished by positioning the filters 14 on opposite extending blades 16 as shown in FIG. 1. If an odd number of fan blades are supplied on the fan 10, the filter 14 should be placed on the nearest opposing blades. The filters are removed and replaced when they become saturated with contaminants.

FIGS. 3–6 illustrate an alternate embodiment. Two layers 24a, 24b of filter material can be joined together along the compressed strip 46' to form the filter 14' of FIG. 3. The layers 24a, 24b are similar in construction to layer 24 (FIG. 2) and have similar components denoted respectively by an a or b. Each layer 24a, 24b has substantially the same width and length prior to forming the compressed strip 46'. The layers 24a, 24b may have different thicknesses, however, and be made of different materials or have different size fibers or pores for filtering various size particles. Each layer 24a, 24b can also be coated with different coatings. For example, the upper layer 24a may be coated with a tackifier, whereas the lower layer 24b may be coated with activated carbon.

Figure 3:
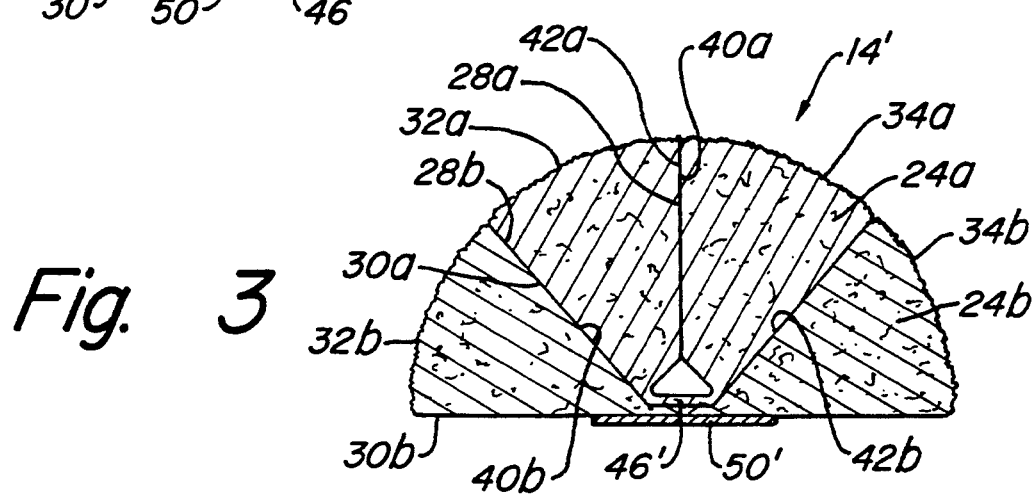
FIG. 3 is a cross-sectional view of an alternate embodiment of the filter, the filter being constructed from two layers of filter material in accordance with the invention.

The upper surface 28a of upper layer 24a is divided into two halves 40a, 42a. The halves 40a, 42a are located in separate planes generally perpendicular to the lower surface 30b of the lower layer 24b and are in a contacting relationship with each other. The lower layer 24b also has an upper surface 28b which is divided into two halves 40b, 42b by the compressed strip 46'. The halves 40b, 42b of the upper surface 28b of the lower layer 24b are at acute angles in relation to the lower surface 30b. The halves 40b, 42b contact the lower surface 30a of the upper layer 24a so that the filter material of the filter 14' formed by upper and lower layers 24a, 24b in FIG. 3 is generally continuous throughout. The compressed strip 46' joins the layers 24a, 24b together and causes the layers 24a and 24b to expand in thickness from the compressed strip 46' to the side edges 32a, 32b, 34a, 34b so that the filter 14' has a substantially semicircular cross section. An adhesive strip 50' is attached to the lower surface 30b of the filter 14' for attaching the filter 14' to a fan blade. The filter 14' is attached to the ceiling fan in the same manner as described above for filter 14 of FIG. 2.

Figure 4:
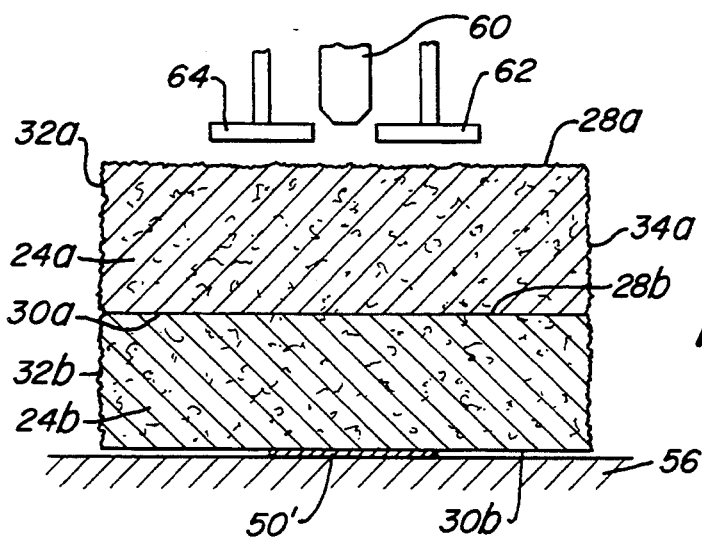
FIG. 4 is an cross-sectional view of layers of filter material for the filter of FIG. 3, prior to fusing the layers together.
Figure 5:
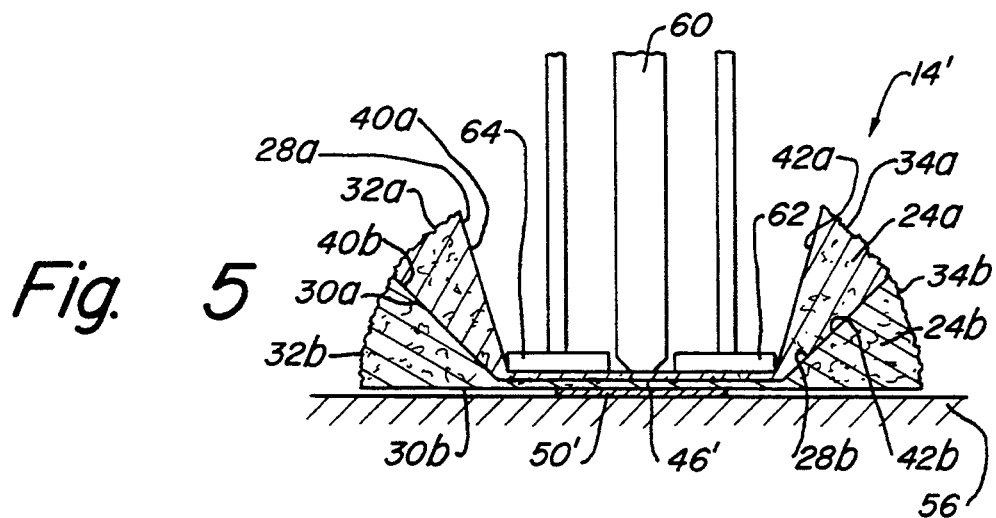
FIG. 5 is a cross-sectional view of the layers of FIG. 4 being deformed and fused together by applying a heat fusion bar in accordance with the invention.

The method for forming the filter 14 of FIG. 2, or the filter 14' of FIGS. 3–6 using two or more layers is essentially the same. For illustrative purposes, however, the method of forming the filter 14' using two layers is described in detail below. Referring to FIG. 4, rectangular blocks or layers of filter material 24a, 24b are cut to size and stacked one on top of the other. Initially, the upper surface 28a, 28b of each layer 24a, 24b is in a single plane parallel with the bottom surface 30a, 30b (FIG. 4). The adhesive strip 50' is attached to the lower surface 30b of the lower layer 24b. If double-sided tape is used for the strip 50', this is done by removing the backing material from one of the surfaces of the strip 50' and attaching the strip 50' on the lower surface 30b substantially where the compressed strip 46' will be formed. Layer 24b is then positioned below the upper layer 24a and placed on a support surface 56.

The layers 24a, 24b are positioned below a narrow, heated metal blade or heat fusion bar 60, as shown in FIG. 4, so that the heat fusion bar 60 extends along the length to each end edge 36 and substantially along the center of the layers 24a, 24b. The heat fusion bar 60 will have a length equal to at least the length of the layers 24a, 24b and have a width of approximately 1/16th to one-half of an inch. The lower edge of the heat fusion bar 60 is substantially flat. The heat fusion bar 60 is heated to a temperature above the melting point of the filter materials used for the filter 14'. This is typically in the range of 250 to 450 degrees Fahrenheit.

Located below and on either side of the fusion bar 60 are material compression bars 62, 64. The material compression bars 62, 64 are biased downward by a spring (not shown). The compression bars 62, 64 are made of aluminum or other conducting material and are in close proximity to the fusion bar 60 so that heat from the fusion bar 60 heats the compression bars 62, 64 to an elevated temperature. The temperature of the compression bars 62, 64, however, should not be allowed to reach the melting point of the filter materials used in the filter 14'.

The heat fusion bar 60 is lowered along with the compression bars 62, 64 onto the layers 24a, 24b. The compression bars 62, 64 will initially contact the upper surface 20a of layer 24a flattening the filter material of the layers 24a, 24b prior to the fusion bar 60 contacting the upper surface 20a. As the fusion bar 60 and compression bars 62, 64 are lowered further, the compression bars 62, 64 will be forced upward, compressing the spring (not shown) and providing a stabilizing force while the fusion bar 60 engages the filter material of the layers 24a, 24b.

The fusion bar 60 causes the layers 24a, 24b to be compressed against the support surface 56 so that the upper surfaces 28a, 28b of each layer 24a, 24b are divided into two halves 40a, 42a and 40b, 42b respectively. The heat fusion bar 60 should compress the layers 24a, 24b for a period of 2 to 10 seconds with a pressure in the range of 60 to 120 psi. The heat and pressure from the heat fusion bar 60 cause the polyester filter material and the filter's resin binding material to melt and fuse along the bottom of the heat fusion bar 60. This simultaneously forms the compressed strip 46' and causes the upper and lower layers 24a, 24b to be joined together by fusion. If only one layer of filter material is used, as in the filter 14 of FIG. 2, this operation will merely form the compressed strip 46 (FIG. 2). The heat fusion bar 60 is then removed from the layers 24a, 24b.

The heat and pressure from the fusion bar 60, as well as the heat and pressure from the compression bars 62, 64, also causes the adhesive strip 50' to bond more readily to the lower layer 24b. It is important that the backing material of the compressed strip 50' be made of a material that will not be affected by the high temperature of the fusion bar 60. Because the compression bars 62, 64 are at a lower temperature, the filter material directly beneath the compression bars 62, 64 will fuse together.

Figure 6:
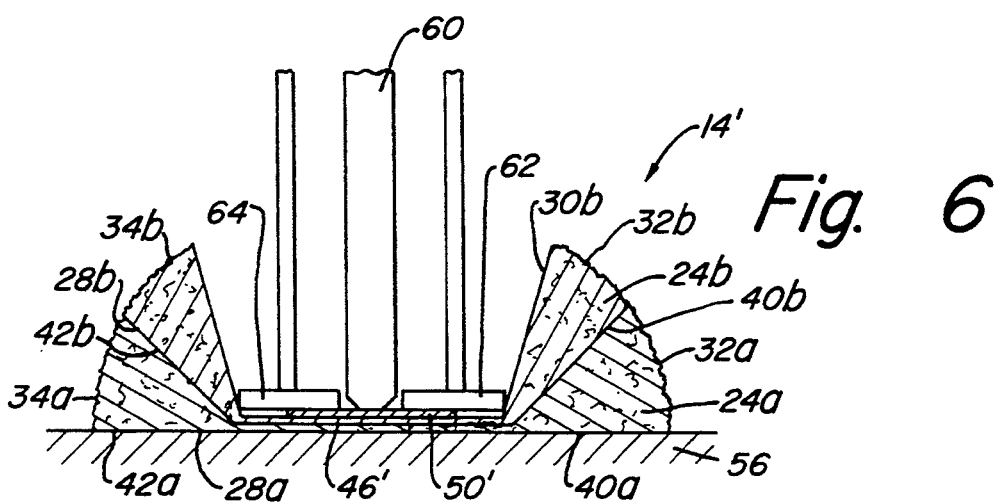
FIG. 6 is a cross-sectional view of layers of filter material for the filter of FIG. 3 being deformed with the adhesive strip being on top of the layers.

Alternatively, as shown in FIG. 6, the layers 24a, 24b may be inverted so that upper layer 24a is positioned below the layer 24b when forming the filter 14'. This allows the adhesive strip 50' to be positioned directly below the fusion bar 60 on the lower surface 30b of the lower layer 24b. The method of forming the compressed strip 46' is essentially the same as described above, but the fusion bar 60 does not come into direct contact with the filter material. Instead, the heat from the fusion bar is passed through the adhesive strip 50' as the fusion bar is lowered onto the layers 24a, 24b causing the filter material to be fused together. The heat on the adhesive strip 50' helps the adhesive strip 50' to bond to the lower layer 24b. Adhesive strip 50' may have a less aggressive adhesive coating than if the strip 50' is located opposite the fusion bar 60, as in FIG. 5. After fusing, the filter 14' is inverted so that adhesive strip 50' is on the bottom. The two halves of the lower side 30b resume a configuration in the same plane as in FIG. 3. The halves 40a, 42a will spring into contact with each other so that the completed filter 14' of FIG. 6 will be identical to FIG. 3 in appearance.

It should be noted that other methods of forming the compressed strip 46' and joining the layers 24a, 24b together could also be used. These may include using commercially available heat sealers or ultrasonic/pressure fusing methods.

The filter of the invention has advantages over prior art ceiling fan filters. The filters are lightweight, flexible, easy to assemble and can be positioned on a fan blade without having to provide a support structure or alter the structure of the fan blade itself. The filter can be formed from different layers of filter material, each layer having a different fiber or pore size and being coated with a different coating, to enhance the performance. By fusing the filter material together in a compressed strip, a semicircular cross-sectional shape is formed that allows the filter to have a higher profile with an increased filtering surface than if a rectangular shaped filter is used. The semicircular shape of the filter also allows air to flow over the surface of the filter more readily without deforming the filter to any great degree or adversely affecting the performance of the fan. The fusing step also causes the adhesive strip to adhere more readily to the filter and allows the manufacturer to use a less aggressive adhesive agent on the side of the adhesive strip that is attached to the filter.

While the invention has been shown in only one of its forms, it should be apparent to those skilled in the art that it is not so limited, but is susceptible to various changes without departing from the scope of the invention.

I claim:

1. A ceiling fan filter for filtering the air in a room having a ceiling fan, the fan having a set of blades extending radially from a central hub, the ceiling fan filter comprising in combination:
   at least one layer of resilient filter material formed from a rectangular block having a length, a width, an initial upper surface, a lower surface, two side edges along the length, and two end edges across the width, the initial upper surface initially being in a single plane parallel with the lower surface, and the two side edges having an initial thickness;
   a compressed strip of resilient filter material in the at least one layer of resilient filter material extending from one end edge to the other dividing the initial upper surface into two halves, the compressed strip being of substantially lesser thickness than the initial thickness of the two side edges, the compressed strip deforming the at least one layer of resilient filter, causing the two halves of the initial upper surface to locate in separate planes, and resulting in an expanded thickness of the two side edges greater than the initial thickness to increase the effective surface filter area of the ceiling fan filter; and
   means for attaching the ceiling fan filter to a surface of at least one blade of the set of blades with the two side edges being generally parallel to the edges of the at least one blade.

2. The ceiling fan filter of claim 1, wherein: the compressed strip causes the two halves of the initial upper surface to locate in separate planes which are upright relative to the lower surface and are generally parallel to each other so that each half of the initial upper surface contacts the other.

3. The ceiling fan filter of claim 1, wherein:
   the means for attaching the ceiling fan filter comprises an adhesive strip located on the lower surface.

4. The ceiling fan filter of claim 1, wherein:
   the ceiling fan filter has a semicircular cross-sectional configuration perpendicular to the length.

5. The ceiling fan filter of claim 1, wherein:
   the at least one layer is formed from a polymeric fiber filter material.

6. The ceiling fan filter of claim 1, wherein:
   the compressed strip is formed by applying thermal energy and pressure to the at least one layer of resilient filter material so that the resilient filter material is fused together in a compressed form.

7. The ceiling fan filter of claim 6, wherein:
   the means for attaching the ceiling fan filter comprises an adhesive strip bonded to the lower surface along the compressed strip; and wherein
   the application of thermal energy and pressure in forming the compressed strip is further applied to the adhesive strip to facilitate the bonding of the adhesive strip to the ceiling fan filter.

8. The ceiling fan filter of claim 1, wherein:
   the at least one layer is formed from non-woven polyester fibers.

9. The ceiling fan filter of claim 1, wherein:
   there are at least two layers, the at least two layers being joined together along the compressed strip.

10. The ceiling fan filter of claim 9, wherein:
    the at least two layers are joined together by applying thermal energy and pressure to the filter material so that the material is fused together.

11. The ceiling fan filter of claim 1, wherein:
    the layer of filter material is coated with a antimicrobial agent.

12. The ceiling fan filter of claim 1, wherein:
    the layer of resilient filter material is coated with a tackifying agent.

13. The ceiling fan filter of claim 1, wherein:
    the layer of resilient filter material is coated with activated carbon.

14. A ceiling fan filter for filtering the air in a room having a ceiling fan, the fan having a set of blades extending radially from a central hub, the ceiling fan filter comprising in combination:
    at least one layer of resilient filter material formed from non-woven polyester fibers having a length, a width, an initial upper surface, a lower surface, two side edges along the length, and two end edges across the width, the initial upper surface initially being in a single plane parallel with the lower surface, and the two side edges having an initial thickness;
    a compressed strip of resilient filter material in the at least one layer of resilient filter material extending from one end edge to the other dividing the initial upper surface into two halves, the compressed strip being of substantially lesser thickness than the initial thickness of the two side edges, the compressed strip deforming the filter, causing the two halves of the initial upper surface to locate in separate planes, and resulting in an expanded thickness of the two side edges greater than the initial thickness to increase the effective surface filter area of the ceiling fan filter, the compressed strip being formed by applying thermal energy and pressure to the resilient filter material so that the at least one layer of resilient filter material is fused together; and means for attaching the ceiling fan filter to a surface of at least one blade of the set of blades with the two side edges being generally parallel to the edges of the at least one blade.

15. The ceiling fan filter of claim 14, wherein:
there are at least two layers, the at least two layers being joined together along the compressed strip.

16. The ceiling fan filter of claim 15, wherein:
the at least two layers are joined together by heat fusing the at least two layers together.

17. The ceiling fan filter of claim 15, wherein:
the at least two layers are joined together by ultrasonically fusing the at least two layers together.

18. The ceiling fan filter of claim 14, wherein:
the compressed strip causes the two halves of the initial surface to locate in separate planes which are upright relative to the lower surface and are generally parallel to each other so that each half of the initial upper surface contacts the other.

19. The ceiling fan filter of claim 14, wherein:
the means for attaching the ceiling fan filter comprises an adhesive strip located on the lower surface.

20. The ceiling fan filter of claim 19, wherein:
the adhesive strip is bonded to the lower surface along the compressed strip; and wherein
the application of thermal energy and pressure in forming the compressed strip is further applied to the adhesive strip to facilitate the bonding of the adhesive strip to the filter.

21. The ceiling fan filter of claim 19, wherein:
the adhesive strip is a double-sided tape.

22. The ceiling fan filter of claim 14, wherein:
the ceiling fan filter has a semicircular cross-sectional configuration perpendicular to the length.

23. The ceiling fan filter of claim 14, wherein:
the layer of resilient filter material is coated with a antimicrobial agent.

24. The ceiling fan filter of claim 14, wherein:
the layer of resilient filter material is coated with a tackifying agent.

25. The ceiling fan filter of claim 14, wherein:
the layer of resilient filter material is coated with activated carbon.

26. A method of forming a ceiling fan filter for filtering the air in a room having a ceiling fan, the fan having a set of blades extending radially from a central hub, the filter being attached to the surface of at least one of the blades, the method comprising:
providing at least one rectangular layer of resilient polymeric filter material having a length, a width, an upper surface, a lower surface, two end edges across the width, and two side edges along the length, each side edge having an initial thickness; and fusing a compressed strip of the at least one rectangular layer of resilient polymeric filter material along the upper surface from one end edge to the other of reduced thickness relative to the initial thickness of the two side edges, so that the upper surface is divided into two halves along the compressed strip causing the two halves of the upper surface to locate in separate planes, and resulting in an expanded thickness of the two side edges greater than the initial thicknesses of the side edges to increase the effective surface filter area of the ceiling fan filter.

27. The method of claim 26, wherein:
the step of fusing the at least one rectangular layer of resilient polymeric filter material is accomplished by placing the at least one rectangular layer of resilient polymeric filter material on a base support and lowering a heated blade onto the filter material and pressing the heated blade downward so that the at least one rectangular layer of resilient polymeric filter material is compressed between the heated blade and base support and heated above the melting point of the at least one rectangular layer of resilient polymeric filter material.

28. The method of claim 26, wherein:
the step of providing at least one rectangular layer of resilient polymeric filter material includes providing at least two rectangular layers of resilient polymeric filter material; and wherein
the step of fusing the at least one rectangular layer of resilient polymeric filter material includes the step of joining the at least two rectangular layers of resilient polymeric filter material together along the compressed strip.

29. The method of claim 26, further comprising:
attaching an adhesive strip on the lower surface of the at least one rectangular layer substantially along the compressed strip for attaching the ceiling fan filter to a blade of the set of blades.

30. The method of claim 29, wherein:
the steps of attaching the adhesive strip on the lower surface of the at least one rectangular layer and fusing the at least one rectangular layer of resilient polymeric filter material together are accomplished by placing the at least one rectangular layer of resilient polymeric filter material and adhesive strip on a base support and lowering a heated blade onto the at least one rectangular layer of resilient polymeric filter material and adhesive strip and pressing the heated blade downward so that the at least one rectangular layer of resilient polymeric filter material and adhesive strip are compressed between the heated blade and base support, the blade heating the at least one rectangular layer of resilient polymeric filter material above the melting point of the at least one rectangular layer of resilient polymeric filter material and facilitating the bonding of the adhesive strip to the filter material.

31. The method of claim 26, further comprising:
coating the at least one rectangular layer of resilient polymeric filter material with an antimicrobial agent.

32. The method of claim 26, further comprising:
coating the filter material with a tackifying agent.

33. The method of claim 26, further comprising:
coating the at least one rectangular layer of resilient polymeric filter material with activated carbon.

* * * * *